United States Patent [19]

Millerd et al.

[11] Patent Number: 4,705,998
[45] Date of Patent: Nov. 10, 1987

[54] AUTOMATIC WINDOW WIPER CONTROL

[75] Inventors: Donald L. Millerd, San Diego; Marl J. Bell, Valley Center, both of Calif.

[73] Assignee: Steven Alpert, Encinitas, Calif. ; a part interest

[21] Appl. No.: 12,617

[22] Filed: Feb. 9, 1987

[51] Int. Cl.$^4$ ................................................. B60S 1/08
[52] U.S. Cl. ...................................... 318/444; 318/480; 318/483; 318/490; 318/DIG. 2; 15/250.17
[58] Field of Search .............. 318/443, 444, 445, 480, 318/483, 490, 643, DIG. 2; 15/250 C, 250.17

[56] References Cited

U.S. PATENT DOCUMENTS 3,649,898 3/1972 Inoue ............................. 318/443 X
4,665,351 5/1987 Nyberg ..................... 318/DIG. 2 X Primary Examiner—Bentsu Ro
Attorney, Agent, or Firm—Frank D. Gilliam

[57] ABSTRACT

The invention is directed to an automatic wiper control circuit for operating window wipers automatically when moisture is sensed. The control circuit additionally provides for increasing the speed of a dual speed wiper motor when a high level of moisture is detected. The system comprises a moisture sensor which senses moisture thereon. A circuit associated with the moisture sensor converts the moisture level to DC voltage. At a preselected level of this DC voltage the wiper motor operates in one of its two different speeds. A lack of a predetermined amount of moisture terminates the wiper motor operation. If the control circuit terminates the wiper motor action during wiper sweep, the normal homing circuit of the wiper motor continues to operate the motor until the wiper blade or blades reach the wiper blade home position. Sequential illumination of a plurality of light emitting diodes (LEDS) occur during a wiping cycle when the circuit is operating normally. A switch is provided to remove the automatic wiper control circuit from the conventional automotive wiper motor circuit. A separate LED provides a visual indication of automatic wiper control circuit disconnection from the conventional automotive wiper motor circuit.

14 Claims, 4 Drawing Figures

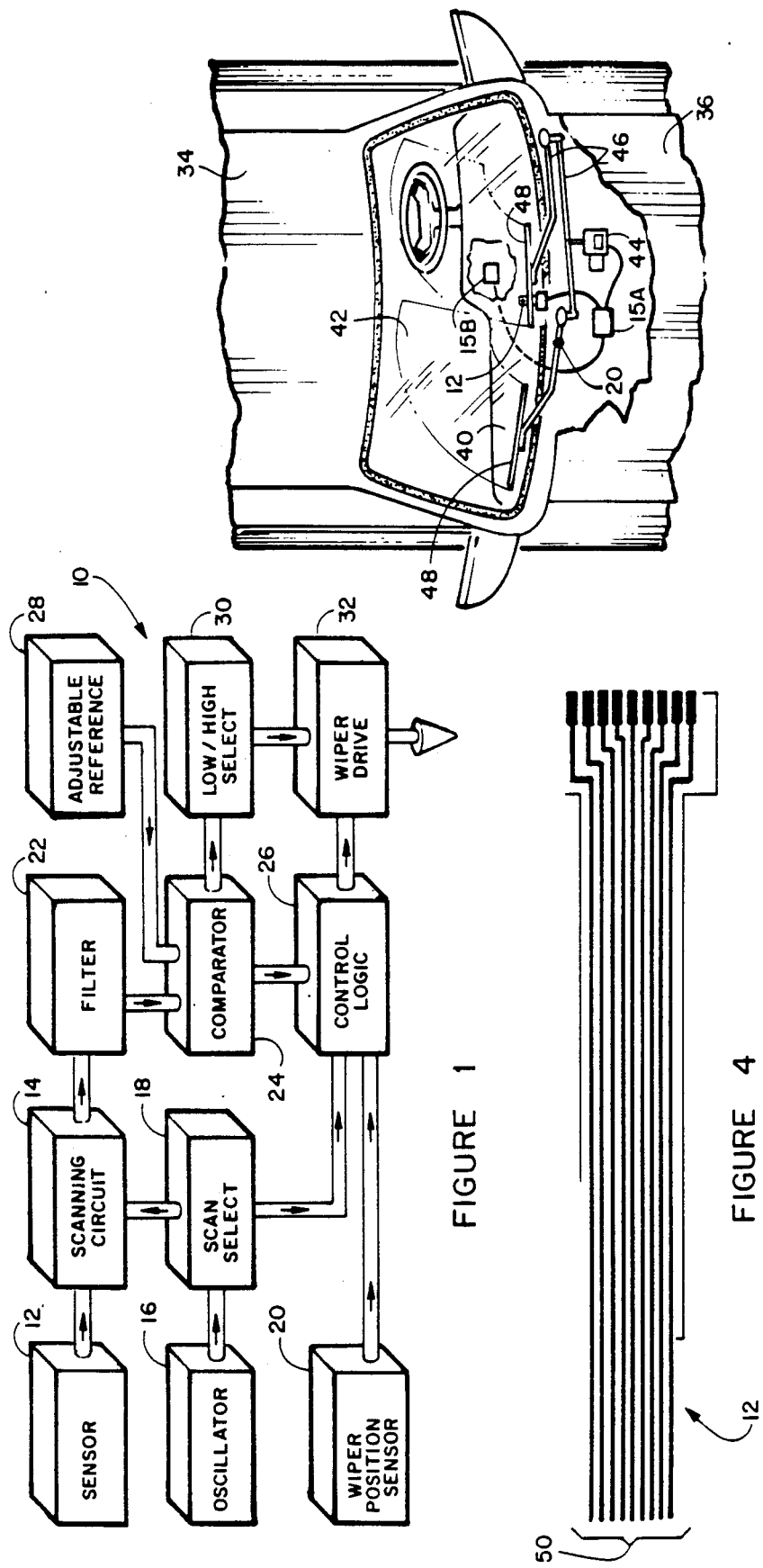

AUTOMATIC WINDOW WIPER CONTROL

BACKGROUND OF THE INVENTION

The present invention relates generally to a wiper motor control system for clearing windows including, but not limited to, an automotive windshield or rear window wiper blade or blades, which automatically operates and controls the operating speed of a wiper blade or blades according to rain or moisture conditions. More particularly, the invention relates to a wiper motor control system having an exterior sensor which continually monitors moisture conditions on the windshield or rear window and is influenced thereby to remain inoperative or to operate the wiper motor in one of two speeds according to this influence. The sensor is positioned within an area swept by the wiper blades.

U.S. Pat. No. 4,554,493 teaches an apparatus for automatic activation and control of windshield wiper blades in response to moisture accumulation at the exterior surface of the windshield, including a pair of wires sandwiched within the windshield laminate and positioned below the surface of the windshield. The wiper blades provide a variable capacitance to a detection circuit. Wiper blade action is initiated when the capacitance measurement exceeds a predetermined reference standard.

U.S. Pat. No. 4,463,294 teaches a control circuit for a windshield wiper motor which utilizes a plurality of infrared emitters that emit a chain of infrared pulses towards a plurality of infrared sensors. When rain passes between the infrared emitters and sensors, the rain interrupts the flow of pulses therebetween. A control circuit senses the missed pulses and selectively energizes a low-speed, mid-speed, and high-speed windings associated with the wiper motor.

U.S. Pat. No. 4,495,452 teaches a windshield wiper motor control which receives information as to the amount of moisture on the windshield through a sensor within the area swept by the windshield wipers. The sensor may be of the capacitive type and may generate an AC-signal the frequency of which is indicative of the relative humidity of the windshield. The sensor and circuit of this teaching is susceptible to temperature changes and impurities present on a dry windshield.

U.S. Pat. No. 4,527,105 teaches additional means for automatic operation of windshield wiper motors.

All improved automatic window wiper motor system which overcome the short comings of the prior art and improves safety, especially, when used in the control of automobile windshield and rear window wipers would find wide acceptance.

SUMMARY OF THE INVENTION

This invention is directed to the automatic control of window wiper motor including the windshield wiper motor of an automotive vehicle and a control which operates under all moisture or rain conditions to keep the window clear of moisture or rain. An automatic windshield wiper motor control of this nature allows the operator of an automotive vehicle to concentrate on driving when under adverse weather conditions and not break concentration directed to the automotive operation by continually adjusting the speed or operation of the windshield wiper blade or blades or adjusting existing time delay circuitry.

Applicants provide an automotive windshield or rear window wiper motor control system which includes a novel sensor means comprised of a plurality of side-by side exposed conductive strips positioned on the external surface of the windshield or rear window in the path of a wiper blade sweep. A multiplexer circuit continues to select adjacent pairs of the conductive strips and connects a DC voltage to one end of one of a selected strip and connects one end of the other selected strip to the control circuit input. When moisture or water is present between adjacent strips simultaneously connected by the multiplexer circuit, the DC voltage conducts between the normally open circuit selected strips to the control circuit. The DC voltage level present at the control circuit input will depend on the amount of moisture or rain between the strips and the conductivity of that moisture or rain. When a selected level of DC voltage is present at the input of the control circuit the wiper motor will become operative. A slight amount of moisture or rain present, above a minimum preselected level, will operate the wiper motor at a first slow speed and an amount of moisture or rain exceeding a range for the selected level for low speed wiper motor operation will cause the wiper motor to operate at a second or faster speed when the motor is equipped for a multi-speed operation. Additional circuits could be added to accomodate additional available wiper motor speeds greater than two. Most modern automotive vehicles are factory equipped with a standard two speed wiper motor and the explanation herein is directed to such a motor, but the invention should not be considered limited to two speed motors or to the application to automatic windshields or rear windows as the invention can be employed for use with single or multi-speed wiper motors which are used on any type of window, windshield and the like.

The motor control circuit of the invention includes a wiper blade position sensor which when influenced by wiper blade passing thereacross initiates the control circuit to determine whether or not the wiper motor will be operated for an additional wiper blade sweep.

The wiper blade position sensor terminates wiper motor operation in the absence of moisture or a level of moisture below a pre-set level on adjacent strips of the sensor. The wiper motor park switch present in modern conventional wiper motors continues to operate the wiper motor after the wiper blade position sensor has instructed the circuit of the invention to terminate wiper motor operation until the wiper blade(s) have reached their home or normally stowed position(s).

The sequencing of the multiplexer is monitored by light emitting diodes (LEDS) of the same or mixed different colors. The operation of these LEDS provide a pleasent "light show" as well as monitoring system operation and therefore are positioned within the view of the automobile operator and passengers. The presence of the LEDS illumination and failure of wiper action would indicate that the blade is frozen to the window or otherwise prevented from movement.

A local control switch convenient to the operator allows the switching of the automatic wiper motor control system in or out of the normal wiper motor circuit, as selected by the operator. An LED associated with the local control switch illuminates when the automatic wiper motor system of the invention has been disconnected.

It is an object of the invention to provide an automatic control for a windshield wiper motor which is responsive to moisture or rain deposited on the exterior surface of the windshield.

It is a further object of the invention to provide a sensor comprised of a plurality of side-by-side conduction strips, pairs of which are multiplexed for sequential moisture sensing thereacross.

It is a further object of the invention to provide means for automatically changing the speed of the wiper motor with changing moisture conditions.

It is still a further object of the invention to provide a wiper blade position sensor for sensing moisture conditions on the moisture sensor during the wiper blade sweep across the wiper blade position sensor.

It is still a further object of the invention to utilize the home-park switch of the wiper motor to return the wiper blade or blades to the home or stowed position after wiper motor termination by the automatic wiper motor control.

A yet further object of the invention is to provide LEDS for visually monitoring the operating sequence of the multiplexer circuits.

These and other objects and benefits of the invention will be apparent to those skilled in the art based upon the following detailed description taken in combination with the following drawings, wherein;

BRIEF DESCRIPTION OF THE DRAWINGS

FIG. 1 is a block diagram showing of the inter connected elements of the present invention;

FIG. 2 is a top plan view showing in partial cutaway the present invention adapted to the forward portion of an automotive vehicle;

FIG. 4 is a typical printed circuit moisture sensor.

DETAILED DESCRIPTION OF THE PREFERRED EMBODIMENT

Figure 3:
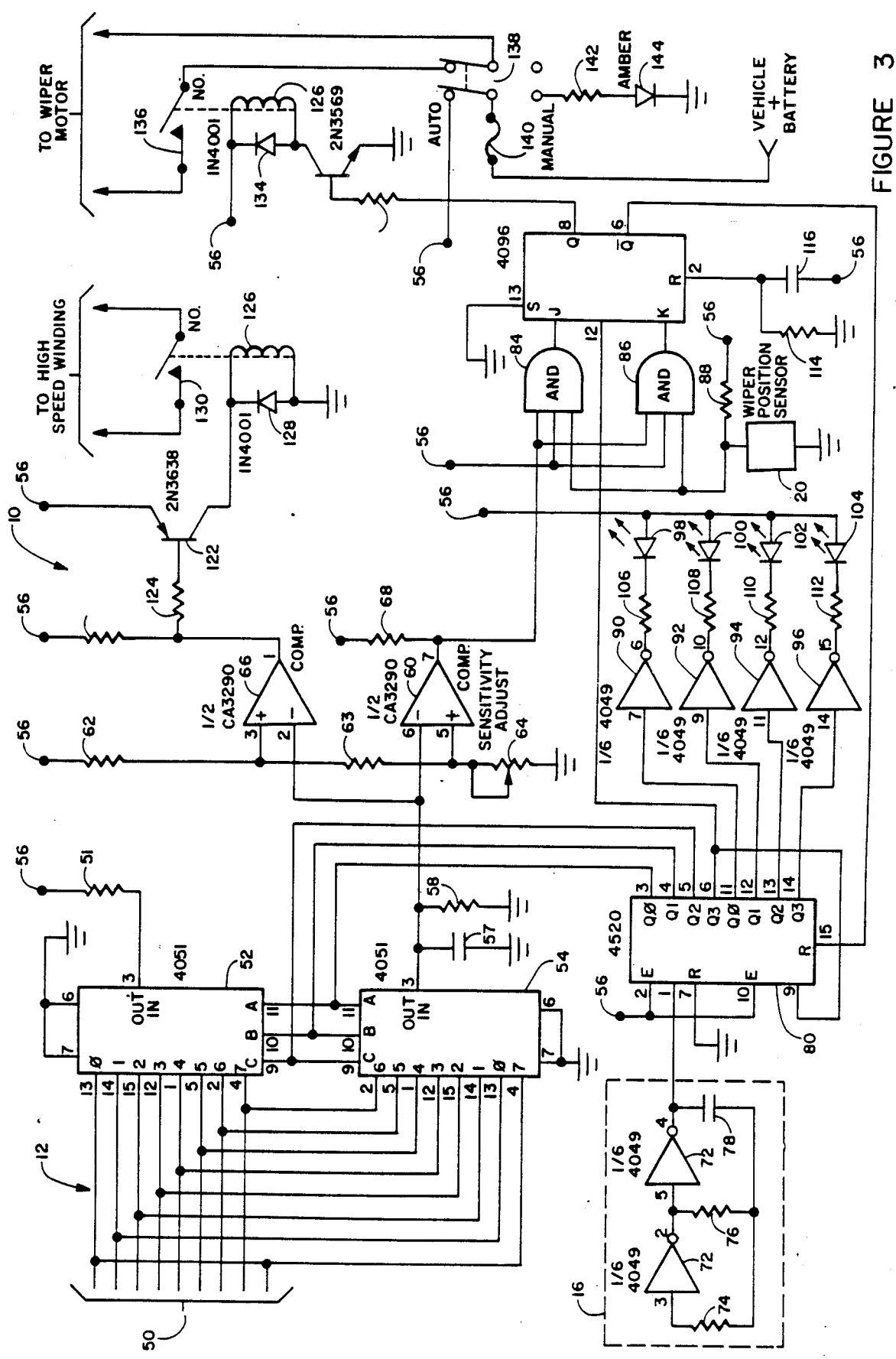
FIG. 3 is a detailed schematic showing of the circuit of FIG. 1.

Referring now to FIG. 1, there is shown a block diagram of the automatic wiper motor control system 10 of the present invention. The system comprises a sensor 12, a scanning circuit 14, an oscillator 16, a scan select circuit 18, a wiper blade position sensor 20, a filter 22, a high speed comparator 24, a control logic circuit 26, an adjustable reference voltage 28, a low/high speed wiper motor speed select circuit 30, and a wiper motor energize circuit 32. These circuits which are hereinafter described in greater detail are electrically interconnected as shown by the various connecting lines therebetween. The arrow heads on the interconnecting lines denote direction of signal or current flow therebetween.

Referring now also to FIG. 2 which shows, in partial cutaway, the forward portion of an automobile 34 incorporating the present invention.

The automobile 34 typically includes a hood 36, top 38, dash 40, windshield 42, wiper motor 44, wiper motor to wipe blade linkage 46 and a pair of wiper blades 48.

Shown centrally located on windshield 42 is the system moisture sensor 12. The moisture sensor is electrically connected to circuit components (hereinafter discussed in detail) contained within housing portions 15A and 15B which in turn are interconnected to the wiper blade position sensor 20. Wiper motor 44 is connected to 15A. Portion 15A of the housing portion is positioned out of view of the automobile operator generally under the hood 36 while portion 15B is mounted on the dash 40, for example, in view of the automobile operator.

The wiper motor 44 is interconnected to the wiper blades 48, through conventionally known linkage 46 and therefore, no detailed explanation of the linkage is included herein.

Referring now specifically to FIGS. 3 and 4, a schematic diagram of the inter-connections of the various elements of an automobile wiper motor control system 10 is shown in FIG. 3 and a typical printed circuit type sensor 12 is shown in FIG. 4.

The moisture sensor 12 is comprised of a plurality of side-by-side positioned exposed conductive elements 50. The spacing of these elements can be varied according the the moisture anticipated, or the amount of impurities within the expected moisture. The elements 50 have a width for example of from 1.0 to 100 mils. Typically the elements will be from 15 to 62 mils in width and spaced from 15 to 62 mils apart. The width of the conductive elements and their spacing is not critical and can be varied and still be utilized successfully to practice this invention. The elements 50 are generally partially disposed within an insulation medium such as flexible plastic and the like. Typically flat strap harness material well known by the electronic art is satisfactory. The sensor 12 is adhered to the outer surface of the windshield with the exposed conductive elements 50 being positioned for encountering a wiper blade 48 during its normal to-and-fro sweep. Although, it is anticipated that only one wiper blade of a two wiper blade conventional automobile windshield wiping system will encounter the sensor 12 in its pass, both wipers' blades could encounter the sensor 12 in their sweep path without altering the operation of the automatic wiper motor control system of this invention.

Each element 50 of the sensor 12, nine shown for the purpose of explanation, more or less could be employed, is connected to a separate output of a multiplexer 52. A second multiplexer 54 is connected to each elements 50 in the same manner as multiplexer 52. The multiplexers 52 and 54 are interconnected according to the manufacturers specifications so that one of the adjacent pairs of elements 50 are connected through a 100K ohm resistor 51 to a positive DC voltage source 56 to multiplexer 52 and the other one of the adjacent pair is connected to the output of multiplexer 54. It should be understood that the adjacent elements in a normal dry condition appear as an open circuit between the two multiplexers, preventing voltage from source 56 from being present on the output of the multiplexer 54. The amount of moisture on adjacent elements 50 and the amount of impurities in that moisture present determine the level of voltage present at the output of the multiplexer 54 for any given moisture condition.

As the moisture accumulates on the sensor, each pair of adjacent elements 50 in turn provide a voltage level at the output of the multiplexer 54. This voltage level is stored in a capacitor 57 of 10 micro farads. This stored voltage in capacitor 57 is continually bleed to ground through a resistor 58 of 470K ohms. The theory is that when sufficient moisture accumulates on the sensor 12 between wiper blade sweeps, the capacitor will be sufficiently charged to overcome the bleed off through the resistor 58 and provide a voltage level at the inverting input of a voltage comparator 60. The voltage comparator 60 has its non-inverting input connected to the DC voltage source 56 through a 22K ohm resistor 62, a 3.3K resistor 63, and a 100K ohm potentiometer 64 to ground. The potentiometer 64 adjusts the desired level of DC voltage at the non-inverting positive input of the voltage comparator 60 in comparison to the DC voltage at the inverting input. The operation of the system sensitivity control will be hereinafter explained.

A second voltage comparator 66 which also has its inverting input connected to the output of the multiplexer 54 and its non-inverting positive input connected to the common connection between resistors 62 and 63. The output of the voltage comparator 60 is connected to the DC voltage source 56 through a resistor 68 of 100K ohms as is comparator 66 through a resistor 70 of 100K ohms.

Oscillator 16 comprises a pair of buffer inverters 72, a resistor 74 of 10K ohms, a resistor 76 of 27K ohms, and a capacitor 78 of 0.22 micro farads. The oscillator output is connected to clock terminal A of one portion of a dual up counter 80. The three outputs of this portion of the dual up-down counter 80 are connected to the sequence control of the multiplexers 52 and 54. The reset terminal of this portion of the dual up-down counter 80 is connected to ground potential. The enable of the second or other portion of the dual up counter 80 is connected to the DC voltage source 56. The clock terminal B of the up counter 80 is connected to a fourth output terminal of the first section of the dual up counter which also provides a clock input to a flip-flop circuit 82.

The output of the voltage comparator 60 is also connected to a terminal of an And gate 84 and an And gate 82 and the other inputs to the last mentioned And gates are provided from the DC voltage source 56 and the output of the wiper blade position sensor 20. The wiper blade position sensor output is also connected to the DC voltage source through a resistor 88 of 10 Kohms.

Outputs from the other half of the up counter 80 are each connected to one input of four inverters 90-96. The outputs of each of these inverters are connected to the cathodes of light emitting diodes (LEDS) 98-104 respectively through associated resistors 106-112 of 680 ohms. The anodes of the LEDs are connected to the DC voltage source 56.

The reset terminal of the flip-flop circuit 82 is connected to one end of a resistor 114 of 470K ohms and to one side of a capacitor 116 of 1 micro farad. The other end of resistor 114 is connected to ground and the opposite side of capacitor 116 is connected to the DC voltage source 56. The inverted output of the flip-flop circuit 82 is connected to the reset terminal of one of the counter sections of the dual up counter. The non-inverted output of the flip-flop circuit 82 is connected to the base of a transistor 118 through a resistor 120 of 1.8K ohms. The set terminal of the flip-flop circuit 82 is connected to ground. The output of the And gate 84 is connected to the "J" input and the output of the And gate 86 is connected to the "K" input of the flip-flop circuit 82.

The output of the voltage comparator 66 is also connected to the base of transistor 122 through resistor 124 of 2.2K ohms. The emitter of transistor 122 is connected to the DC voltage source 56 and the collector is connected through the wiper motor speed relay coil 126 to ground. A diode 128 is connected across the coil 126. The relay coil operates to close a normally open relay switch 130 when the transistor 122 conducts. The relay switch 130 provides voltage to the high speed winding of the dual speed wiper motor 44. Dual speed wiper motors of this type are commonly employed on modern automobiles.

The emitter of the transistor 118 is connected to ground and the collector is connected to one side of relay switch activating coil 132 and a diode 134. The other end of the coil and diode are connected to the DC voltage source 56. A relay switch 136 provides operating voltage to the low speed winding of wiper motor 44 through a two pole/two throw switch 138 which is manually positionable in either the auto position wherein the automatic wiper motor system is in control of the wiper motor or in the manual position wherein the normal vehicle wiper motor control controls the wiper motor. When in a manual operation mode, DC voltage is applied through a 680 ohm resistor 142 and a series LED 144.

The term DC voltage or DC voltage source 56 throughout the discussion refer to the vehicle battery which can be 6 or 12 volts DC the negative pole of which is referred to as ground. The multiplexer 52 and 54 shown are cos/mos analog multiplexers typically of the type CD 4051 or an equivalent thereto. The inverter buffers 72 and 90-96 are type CD 4049 or equivalent. The dual up counter 80 is an CD 4520 or equivalent. And gates 84 and 86 and flip-flop circuit 82 are a CD 4096 or equivalent. The voltage comparators 60 and 66 are single dual voltage comparator circuit's CA 3290 or are two single equivalents or an equivalent dual unit. Transistor 118 is a 2N3569 or equivalent. Transistor 122 is a 2N3638 or equivalent. The wiper blade position sensor 20 can be an optical device, hall effect transistor, magnetic switch, reed switch, waterproof switch, or the like which is activated by wiper contact or sensing.

The various solid state circuits mentioned above have terminals or connections identified in the same manner as those specific circuits noted above and shown in the various drawing figures. It should be understood that equivalent circuits may have differently identified terminals or connections and would be connected to equivalent circuit connections in accordance with the circuit manufacturer's specifications.

The resistors used throughout are typically one quarter watt carbon resistors of approximate value as noted. The potentiometer 64 is a one watt carbon type. The capacitors are chosen to operate safely at 12 volts DC. The LEDS operate on DC voltage and may have any desirable color or colors.

BRIEF DESCRIPTION OF THE CIRCUIT OPERATION

The multiplexer 52 and 54 are analog type multiplexers. The eight channels of each multiplexer are selected by a binary 0 through binary 7. The binary code is produced by the dual binary counter 80. The half of the binary counter that selects the multiplexer channels is clocked by the oscillator made up from inverters 72, the resistor 74, 76 and capacitor 78. If, for example, a water droplet is deposited across two adjacent conductive sensor strips 50, the multiplexer in its sequencing will select these conductive sensor strips. For the brief moment that these conductive sensor strips 50 are selected, there is a current pattern therebetween from the DC voltage source through resistor 51, through the multiplexers to the high side of capacitor 57 thereby charging capacitor 57. As the multiplexers switch, other pairs of conductive sensor strips 50 which have rain or moisture therebetween conduct therebetween in the same manner. Each current path thereby provided will increase the charge on capacitor 57. As the amount of rain or moisture intensity diminish the voltage applied to the capacitor 57 will further diminish due to the constant discharge through resistor 58 until a voltage level below the pre-selected voltage level required to operate the wiper motor will result. The voltage charge on capacitor 57 is continually compared with a preset voltage level on the positive inputs of voltage comparators 60 and 66. The type CA 3290 comparators shown are open-collector devices and require pull up resistors 68 and 70. Two threshold voltage levels for comparison are provided by the voltage divider comprising resistors 62, 63 and potentiometer resistor 64. When the voltage level at the inverting input of comparator 60 is more positive than the voltage level on its non-inverting input, its output becomes a logic "0". A logic "0" at the output indicates water present across sensor strips 50 sufficient to require wiper blade action. For the circuit to now produce a signal that activates the wiper motor 44, flip-flop circuit 82 must have proper inputs. The output from voltage comparator 60 provides an inputs. The output from voltage comparator 60 provides an input to the inverting input of the And gate 84 which must be a binary "0" and the other two inputs to the And gate 84 must be a binary "1". One of the two inputs is always "1" since it is connected directly to the DC voltage source 56 and the other is initially a binary "1" until the wiper blades reach the wiper blade sensor position. The output of the And gate 84 is now binary "1" Under these conditions a binary "1" will appear at the non-inverting output Q of flip-flop 82 if the clock input to the flip-flop makes a transition from binary "0" to binary "1" when the the Q3 output of the first half of dual binary counter 80 makes a binary "0" to binary "1" transition and if the output of And gate 86 is a binary "0". When the non-inverted output Q of flip-flop 82 is a binary "1" the transistor 118 will be biased on. Transistor 118 will conduct from emitter to collector and provide a return path for the relay switch activating coil 132. The diode 134 across the coil 132 is used to squelch the reverse electro motive force (EMF) produced by the coil field collapsing when the relay is de-energized. When the contacts of the relay switch make or close, the wiper motor 44 is activated. When the non-inverted output Q of flip-flop 82 is a binary "1" the inverted output thereof is a binary "0". This inverted output removes the reset pulse from half of the dual binary counter 80 and the clock pulse is now provided from the other half of the same dual up counter. The outputs from one half of the binary counter supply inputs to buffer inverters through their associated resistor sequentially illuminating LEDs 98–104. This provides indication that the multiplexer is operative and a pleasurable light show for the vehicle occupants will be displayed on control portion 15B.

When the wiper motor is activated, the wiper blade or blades will continually wipe across the sensor strips 50, removing the rain drop or drops that caused the prior wiper activation.

The wiper action termination sequence is as follows. When the wiper blade or blades reach the wiper position sensor 20, the position sensor will produce a binary "0" at its connection to the And gates 84 and 86. This is the only position of the wiper blade or blades that the automatic wiper motor control activation can make a decision to de-activate the wiper motor or not. This decision depends on the moisture level between the sensor strips 50 of the sensor 12 and the binary voltage level present at the output of the voltage comparator 60. If the output or voltage level of comparator 60 remains a binary "0" and a binary "0" to "1" transition occurs at the clock input of the flip-flop 82, operation of the wiper motor will continue. If, on the other hand, drops have not reaccumulated across the sensor strips, the output of the voltage comparator 60 will change from a binary "0" to a binary "1" causing the output of the And gates 84 and 86 to provide a binary "0" to the input to flip-flop 82. Also under these conditions, the output of And gate 86 will be a binary "1" causing the non-inverted output of flip-flop 82 to change from a binary "1" to a binary "0" when a binary "0" to "1" transition occurs at the clock input to flip-flop 82. At this time transistor 118, will be turned off which terminates the operating voltage to the wiper motor, ie. switch 136 returns to its normally open condition. The wiper motor will not normally stop when the wiper blade or blades are positioned in the middle of a sweep as the park switch associated with a conventional wiper motor will maintain motor operation until the wiper blade home position is reached. Once the wiper blade or blades start moving toward its home position, the wiper position sensor 20 will change from a binary "0" to a binary "1". This binary "1" forces the output of And gate 86 to switch from a binary "1" to a binary "0" at the same time the other two inputs of And gate 84 are at a binary "1" causing the output of binary "0" at And gate 84. So now the output of the voltage comparator 60 depends on whether or not moisture has re-accumulated between the sensor strips 50 of sensor 12. If moisture re-accumulates after the decision to terminate wiper motor action has been made, the voltage comparator 60's output will change from a binary "1" to a binary "0" and with the conditions above being conductive, wiper motor action resumes in the hereinbefore explained manner. No interruption of wiper action will be observed under these conditions because of the action of the home-park switch. When the automatic controls of the invention terminate wiper motor action the inverted output of the flip-flop 82 will cause the dual up counter to reset, terminating the output to buffer/inverters 90-96 and thereby terminating the sequential illumination of LEDS 98–104.

When the voltage at the inverting input of the voltage comparator 66 is more positive than the voltage level from the DC voltage source through resistor 62, as set by potentiometer resistor 64 and resistor 63, the output of the voltage comparator 66 will change from a binary "1" to a binary "0". The presence of the binary "0" indicates that a high accumulation of moisture or water is present on sensor 12. This condition will cause transistor 122 to conduct from emitter to collector. This conduction provides a return path for the second wiper motor speed relay coil 126, closing the relay switch 130 associated therewith activating the conventional high speed windings of the wiper motor 44. Diode 128 serves the same purpose as the other diode 134 hereinbefore mentioned.

The capacitor 116 and resistor 114 form a power-on-reset for flip-flop 82 so that the wiper motor is off upon initial power up of the automotive wiper motor circuit. The power-on-reset occurs when the vehicle is started (ignition on) if the manual/automatic switch 138 (a dual pole double throw type) has previously been moved from the manual to automatic position shown. If the vehicle has previously been started with switch 138 in the manual position, selecting the automatic mode of switch 138 will cause a power-on-reset to occur. The switch removes the DC voltage source 56 from the wiper motor circuit when the switch 138 is in the manual mode and also when the manual mode is selected the automatic portion of the switch 138 opens causing the current path to the wiper motor to be open. The automatic wiper control circuit is now removed from the wiper motor's normal circuit. Moving the switch 138 from auto to manual causes LED 144 to illuminate.

Throughout the above discussion an automobile windshield wiper motor system has been used to describe an embodiment of this invention. It should be understood that the automobile environment is not intended to limit the use of the invention as obviously, the invention can be employed in conjunction with any window wiper system employing a motor, linkage and blade(s).

The above described embodiment of the invention is merely descriptive of its principles and is not to be considered as limiting in any manner. The scope of the invention instead shall be determined from the scope of the following claims including their equivalents.

What is claimed is:

1. An automatic wiper motor control system for operating a window wiper motor which operates at least one wiper blade to and fro across window for removing moisture from the area which it sweeps, said motor having a park circuit means for returning said wiper blade to a home location when said wiper motor action is terminated at other than the wiper blade home location comprising:
   a voltage source;
   a moisture sensor, said moisture sensor comprising a plurality of spaced apart exposed conductive strips positioned within an area of the sweep of said at least one wiper blade;
   a voltage storage means;
   a scanning circuit for sequentially connecting adjacent pairs of said conductive strips, one of said pair to said voltage source and the other of said pair to said voltage storage means;
   a wiper motor operating circuit;
   a voltage sensing means connected between said voltage storage means and said wiper motor operating circuit, said voltage sensing means activates said wiper motor operating circuit when the voltage level of said voltage storage means exceeds a preselected voltage level; and
   a wiper position sensor means positioned along the sweep of said wiper blade and influenced by the blade passing thereacross for activating the operation of said voltage sensing means, whereby a determination is made by said automotive wiper motor control system to operate said wiper motor or terminate said operation.

2. The invention as defined in claim 1 wherein said wiper motor is multi-speed.

3. The invention as defined in claim 1 wherein said voltage source is a storage battery.

4. The invention as defined in claim 1 wherein said scanning circuit comprises a pair of multiplexer circuits each of which is operated at a common frequency.

5. The invention as defined in claim 1 wherein said voltage sensing means comprises a means to constantly remove a portion of the voltage stored therein.

6. The invention as defined in claim 2 wherein said voltage sensing means comprises means for operating said multi-speed wiper motor at one speed when the voltage in said voltage storage means is above a first preset level and at an increased speed when the voltage in said voltage storage means exceeds a second preset level.

7. The invention as defined in claim 6 wherein the first preset level of voltage which operates said multi-speed wiper motor at said one speed is adjustable.

8. The invention as defined in claim 6 wherein the second preset level of voltage which operates said multi-speed wiper motor at said increased speed is adjustable.

9. The invention as defined in claim 1 additionally comprising visual means for providing indication of operation of said scanning circuit.

10. The invention as defined in claim 9 wherein said visual means includes a plurality of LEDS.

11. The invention as defined in claim 10 wherein said LEDS all illuminate in the same color.

12. The invention as defined in claim 10 wherein some of said LEDS illuminate in different colors than others thereof.

13. The invention as defined in claim 2 additionally comprises a switch for removing said automatic wiper motor control system from control of said multi speed wiper motor and an LED connected in conjunction therewith for a visual indication of the removal of said automatic wiper motor control system from control of said multi-speed wiper motor.

14. The invention as defined in claim 1 wherein said park circuit means continues to operate said wiper motor when said wiper blade across said position sensor causes said automatic wiper motor control to terminate operation of said wiper motor.

* * * * *